Aug. 25, 1964  D. L. PLUGGE ETAL  3,145,855
DEVICE FOR LEVEL FILLING A LARGE CONTAINER
Filed Oct. 15, 1962  3 Sheets-Sheet 2
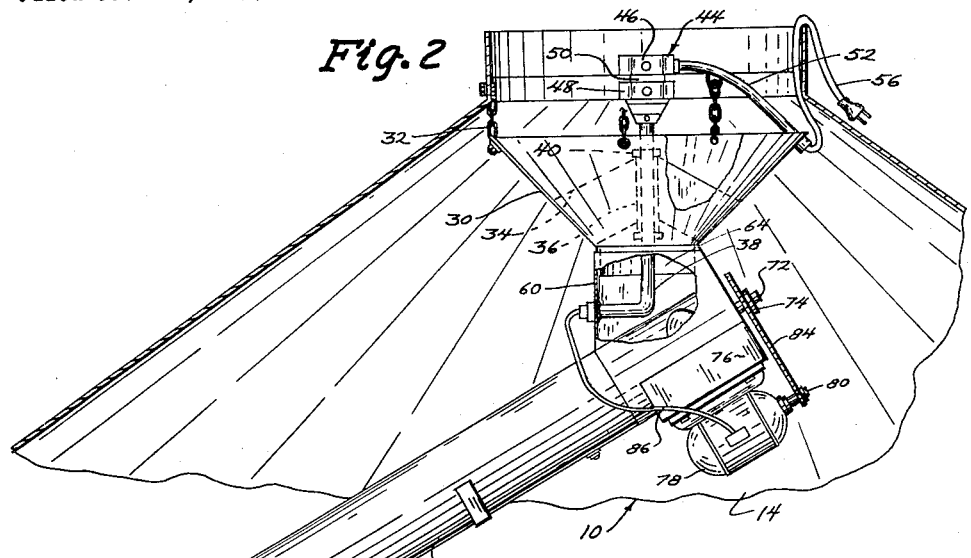
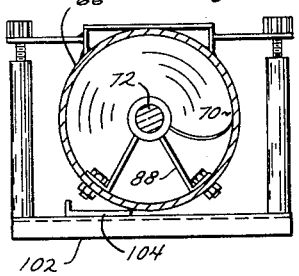
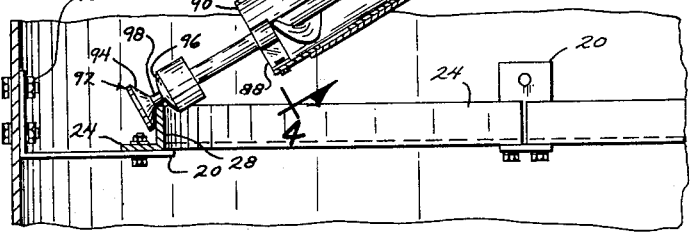
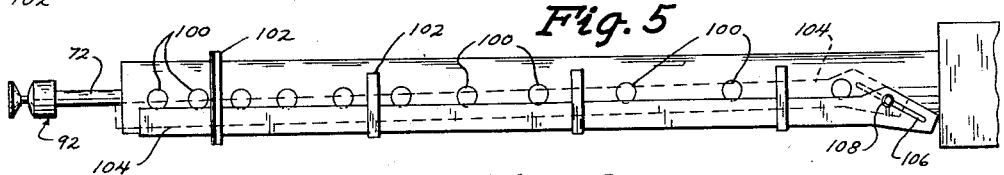
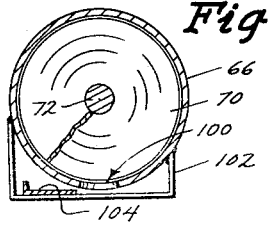
INVENTORS
DALE L. PLUGGE
VALERIAN L. SHONKA
BY Dick, Zarley & Henderson
ATTORNEYS

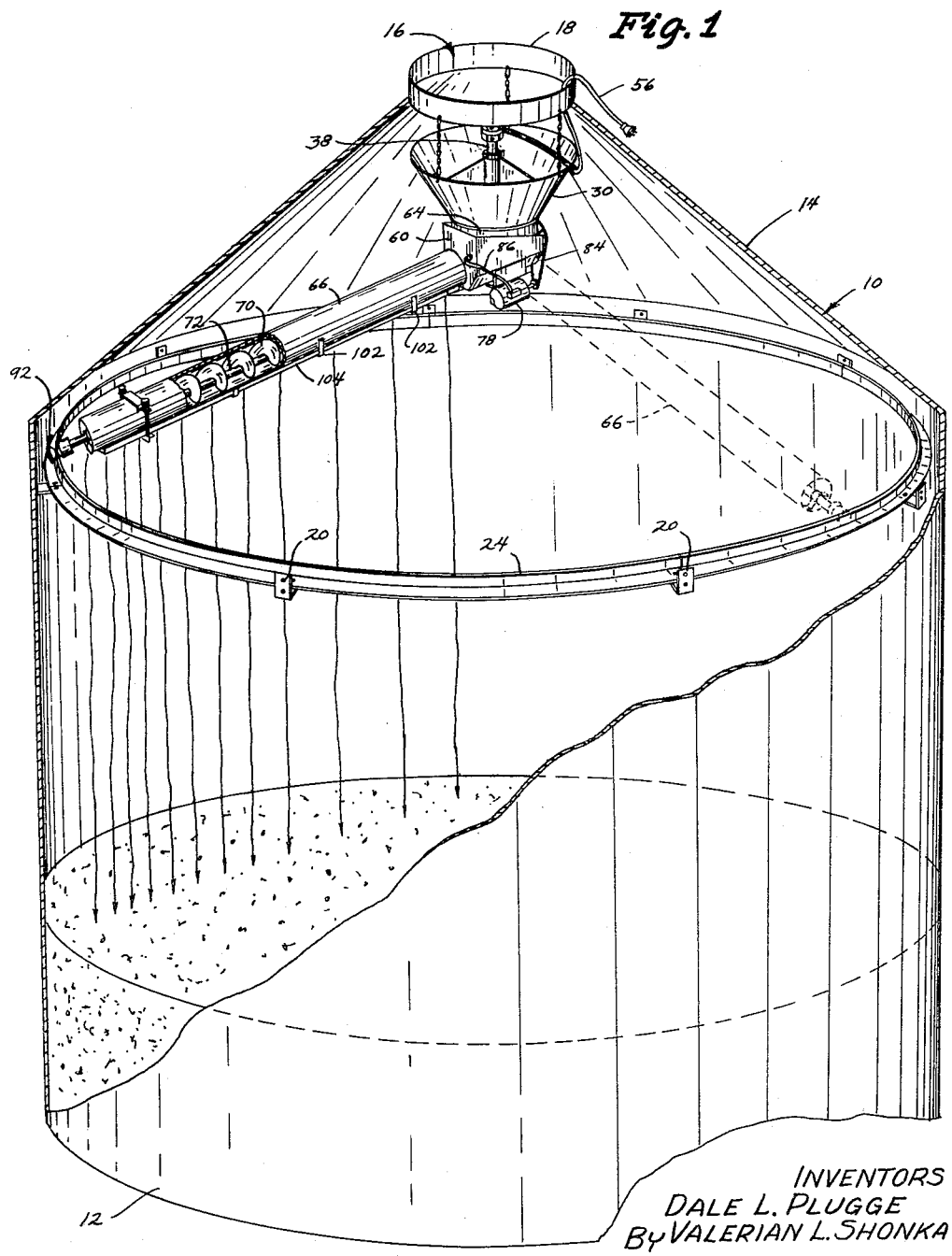

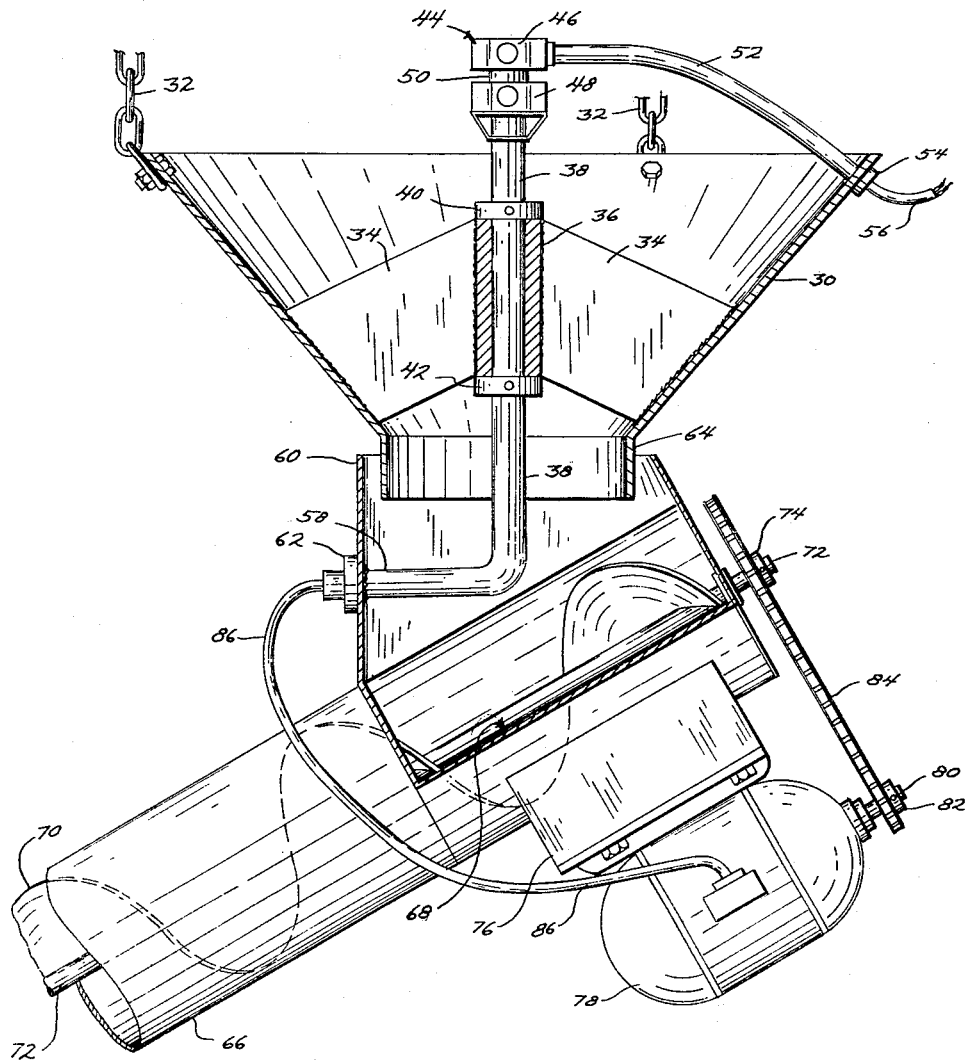

United States Patent Office 3,145,855
Patented Aug. 25, 1964

3,145,855
DEVICE FOR LEVEL FILLING A LARGE CONTAINER
Dale L. Plugge and Valerian L. Shonka, Columbus, Nebr., assignors to Behlen Manufacturing Company, Inc., Columbus, Nebr., a corporation of Nebraska
Filed Oct. 15, 1962, Ser. No. 230,590
3 Claims. (Cl. 214—17)

Grain is commonly introduced into an access opening in the top center of a circular grain storage bin. It is highly desirable to maintain a level condition of the grain as it is deposited into the bin, because unnecessary pyramiding of the grain adds to the problems of caring for the grain after it has been deposited in the bin. Our invention relates to a device that will uniformly spread the grain in a level condition as it is deposited in a storage bin, and this is the principal object of our invention.

A further object of our invention is to provide a device for level filling a large container which includes a material dispensing auger means which is supported in a substantially horizontal position and which rotates about one of its ends to uniformly discharge grain into a bin.

A still further object of our invention is to provide a device for level filling a large container which is easy to install in conventional bins.

A still further object of our invention is to provide a device for level filling a large container which includes a material dispensing auger means which is supported in a substantially horizontal position and which rotates about one of its ends to uniformly discharge grain into a bin, wherein the auger element of the auger means provides the power to rotate the entire auger means.

A still further object of our invention is to provide a device for level filling a large container wherein the flow of grain passing therethrough can be selectively adjusted.

Still further objects of our invention are to provide a device for level filling a large container that is economical in manufacture, durable in use and refined in appearance.

These and other objects will be apparent to those skilled in the art.

Our invention consists in the construction, arrangements, and combination of the various parts of the device, whereby the objects contemplated are attained as hereinafter more fully set forth, specifically pointed out in our claims, and illustrated in the accompanying drawing, in which:

FIGURE 1 is a perspective view of a storage bin wherein our device is mounted with a portion of the storage bin cut away to more fully illustrate the construction of our device;

FIGURE 2 is a partial elevational view of our device mounted in the top of a storage bin;

FIGURE 3 is a partial elevational view of our device showing how the lower end of the auger means is rotatably supported by the rail structure;

FIGURE 4 is a partial sectional view of our device taken on line 4—4 of FIGURE 3;

FIGURE 5 is a bottom view of the auger means showing the location of the material discharge openings as well as the gate structure therefor;

FIGURE 6 is a partial sectional view of our device taken on line 6—6 of FIGURE 3; and FIGURE 7 is an enlarged sectional view of our device similar to FIGURE 2 but more fully illustrating the hopper and auger elements.

We have used the numeral 10 to generally designate a storage bin which is comprised of vertical cylindrical side walls 12 and a frusto-conically shaped roof 14. An access opening 16 appears at the extreme top of roof 14 and a cylindrical vertical flange 18 extends around this access opening.

A plurality of brackets 20 are secured at intervals to the inside surface of the walls 12 of bin 10 adjacent the upper edge thereof. Brackets 20 are secured to the bin 10 by means of nut and bolt assemblies 22. A circular rail 24 comprised of angle iron is secured to brackets 20 by means of nut and bolt assemblies 26. Rail 24 includes a vertical flange 28.

A conically shaped hopper 30 is open at its upper and lower ends and is detachably secured to flange 18 by means of chains 32. Any suitable hooks on the upper ends of chains 32 can be inserted into appropriate apertures in flange 18. Three vanes 34 extend inwardly from hopper 30 towards the center thereof and are rigidly secured to vertical sleeve 36. The vanes can be attached to the hopper in any convenient manner such as by welding or the like. A hollow shaft 38 rotatably extends completely through sleeve 36. Bearing elements 40 and 42 are rigidly secured to hollow shaft 38 at points directly above and below the ends of sleeve 36 to maintain the hollow shaft 38 against relative vertical movement with respect to sleeve 36.

A conventional slip ring conductor unit 44 is secured to the upper end of hollow shaft 38 in conventional fashion. Slip ring conductor unit 44 includes conductor rings 46 and 48 which are rotatably interconnected by conductor element 50. A rigid hollow conduit 52 is secured by one of its ends to ring 46 and has its other end extending through and secured to hopper 30 by means of connector element 54. Lead 56 extends into conduit 52 and is electrically connected to the conductor ring 46. The other end of electrical lead 56 is adapted to be connected to a source of electrical energy.

The lower end portion 58 of hollow shaft 38 is bent at an angle with respect to the remainder of the shaft and extends through and is secured to shroud 60 by means of connecting elements 62. The lower end of shaft 38 is rigidly secured to shroud 60 by means of welding or the like. Shroud 60 extends upwardly and around in spaced relation to the cylindrical collar 64 which is secured to and extends downwardly from the lower end of hopper 30. The shroud 60 also extends downwardly where it is rigidly secured by welding or the like to the upper end of an elongated auger tube 66. As shown in the drawings, the auger tube 66 is held in an inclined position with respect to the vertical axis passing through shroud 60. Shroud 60 is completely enclosed except for its top which embraces the collar 64 of hopper 30. The primary function of shroud 60 is to collect the material moving downwardly from the bottom of the hopper 30 and collar 64 to guide this material to the access opening 68 in the top end of auger tube 66.

An auger unit 70 which includes an auger shaft 72 is housed in conventional manner within the auger tube 66. A sprocket 74 is rigidly secured to the top end of auger shaft 72 as it protrudes through the end wall of shroud 60. A motor bracket 76 is secured by welding or the like to the outside bottom portion of shroud 60 and electric motor 78 with power shaft 80 is mounted thereon in any convenient manner. A sprocket 82 is rigidly secured to the outer end of motor shaft 80 and a conventional sprocket chain 84 interconnects the sprocket 82 with the sprocket 74 on the upper end of the auger shaft 72. An electrical lead extends from the motor 78 upwardly through the hollow shaft 38 where it is electrically connected to the conductor ring 48. Electrical energy is thereupon supplied to the motor 78 through lead 56, thence through ring 46, thence through conductor element 50, thence through conductor ring 48, and thence through the lead 86.

A bearing element 88 is secured to the open lower end 90 of auger tube 66 and auger shaft 72 rotatably extends therethrough to terminate beyond the end of the auger tube. A spindle 92 is rigidly secured to the lower end of the auger shaft 72. Spindle 92 includes a tapered surface 94 which is oppositely disposed and spaced apart from arcuate surface 96. A rail engaging portion 98 appears intermediate the two surfaces 94 and 96. This rail engaging portion 98 is adapted to rotatably engage the top of the vertical flange 28 of rail 24.

A plurality of discharge openings 100 are disposed along the bottom of auger tube 66 in a line parallel with the longitudinal axis of the tube. These discharge openings 100 are preferably circular in shape and as will be noted in FIGURE 5, the distance between adjacent openings progressively increases from the lower end of the tube towards the upper end of the tube. A plurality of brackets 102 are welded or bolted in any convenient manner to the auger tube 66 adjacent the bottom portion thereof and an elongated gate or bar 104 is movably supported thereby. A diagonally positioned slot 106 is located in the upper end of bar 104 and a stud bolt 108 which is rigidly secured to tube 66 is slidably received within the slot. As shown in FIGURE 5, the exertion of a longitudinal force on the bar 104 will also cause the bar to move laterally over the material discharge openings 100. The position of bar 104 depicted by the dotted lines in that figure shows the position of the bar as it partially closes the discharge openings.

The normal operation of our device is as follows: When the lead 56 is connected to a source of electrical energy, the motor 78 is electrically excited in the manner described above. Rotational power is thereupon conveyed to the auger shaft 72 from the power shaft 80 of the motor through chain 84 and the sprocket elements 82 and 74. As auger shaft 72 begins to rotate, the lower end of the shaft will commence to move around the rail 24 by virtue of the lower end of the shaft being rotatably supported on the rail by means of spindle 92. Thus, auger shaft 72 will be rotating about its own axis and will also be rotating about the vertical longitudinal axis of hollow shaft 38. Since the hollow shaft 38 is welded and rigidly secured to the shroud 60, this shaft will also be rotated about its own longitudinal axis. As indicated previously, the shaft 38 is rotatably supported within sleeve 36 and the weight of the shaft, the shroud 60, the auger tube 66 and all related structure is suspended on the bearing element or collar 40 which is rigidly secured to the shaft at the top of the sleeve 36. The shaft 38 and the lead 86 contained therein is permitted relative rotational movement with respect to the lead 56 in conduit 52 by means of the slip ring conductor unit which acts in conventional manner to keep the electrical contact surface of ring 46 in electrical contact with a corresponding surface in ring 48 even though relative rotational movement between these two surfaces is taking place. The detailed structure of slip ring conducting unit has not been shown because of its conventional structure but it can be assummed that conventional insulation means are employed to prevent the hollow shaft 38 from conducting any electrical energy itself.

As the lower end of the auger shaft 72 moves about the circular rail 24, grain or the like can be introduced through the access opening 16 in the storage bin 10. The grain will move downwardly into hopper 30 and thence through the cylindrical collar 64 into shroud 60. The grain will then move from the bottom of shroud 60 through the access opening 68 in auger tube 66. The material will then be carried downwardly through the auger tube 66 by means of gravity and the conventional action of the auger unit 70. The great onrush of material will be at all times more intense near the upper end of the auger tube 66. Thus, a greater quantity of material will generally flow through the extreme upper material discharge opening 100 than will flow through the lowermost discharge opening. However, since the discharge openings are progressively spaced further apart from the lower end to the upper end of the tube 66, a relatively uniform flow of material from the discharge openings along the length of the auger tube will result. This desirable result is further insured by employing the gate or bar 104 which is best depicted in FIGURE 5. If it is determined that the flow of material from the discharge openings in the upper portion of the tube is excessive, the bar 104 can be moved from a position shown by the solid lines in FIGURE 5 to a position approaching the position depicted by the dotted lines in FIGURE 5. The transverse movement of the bar 104, which is caused by the relative force reaction between stud bolt 108 and diagonally positioned slot 106, will impede the flow of material from the uppermost discharge openings. Thus, the flow of material from the auger tube 66 is made uniform by both the spacing of the discharge openings and the function of the gate 104.

Thus, from the foregoing, it is seen that our device will accomplish at least all of its stated objectives.

Some changes may be made in the construction and arrangement of our device for level filling a large container without departing from the real spirit and purpose of our invention, and it is our intention to cover by our claims, any modified forms of structure or use of mechanical equivalents which may be reasonably included within their scope.

We claim:
1. In a device for level filling a large container,
a hopper having an open top and bottom,
an elongated auger tube having an access opening in one of its ends,
a shroud on said auger tube around said access opening to direct material from the bottom end of said hopper into said access opening,
an electric motor secured to said shroud,
an auger unit in said auger tube,
means connecting said electric motor and said auger unit to cause rotation thereof when said motor is energized,
a hollow conduit having one of its ends rigidly secured to said shroud,
said conduit extending upwardly through said shroud and said hopper,
a bearing sleeve in said hopper rotatably receiving said conduit,
means connecting said bearing sleeve and said conduit so that the weight of said conduit and elements secured thereto could at least in part be borne by said bearings means,
a slip ring conductor unit on the upper end of said conduit and including,
two ring elements,
means rotatably and electrically connecting said ring elements,
means adapted to connect one of said ring elements to a source of electrical energy,
and a lead secured to the other of said rings and extending downwardly through said conduit to be connected to said motor.
2. In a device for level filling a large container,
a hopper,
an elongated auger tube having one of its ends in communication with said hopper,
an auger in said auger tube,
power means connected to said auger to induce rotation thereof in said auger tube,
said auger tube having a plurality of discharge openings spaced longitudinally along said auger tube,
an elongated gate member positioned adjacent said discharge openings, the end of said gate member adjacent said hopper having a slot extending at an angle to the longitudinal axis of said auger,
support means on said tube for holding said gate member and said gate member being adapted to move longitudinally and vertically of said tube,
means received in said slot and secured to said tube,
said gate member adapted to be moved longitudinally and vertically towards said tube to at least partially close said openings, said bar adapted to progressively close a larger area of said openings the closer said openings are to said means received in said slot, and means connecting said hopper and said auger tube whereby said auger tube can rotate relative to said hopper about an axis other than its own longitudinal axis.

3. In a device for level filling a large container, a hopper, an elongated auger tube having one of its ends in communication with said hopper, an auger in said auger tube, power means connected to said auger to induce rotation thereof in said auger tube, material discharge openings in said auger tube, the distance between adjacent openings being greater the farther said openings are from the outer end of said tube, and means connecting said hopper and said auger tube whereby said auger tube can rotate relative to said hopper about an axis other than its own longitudinal axis.

References Cited in the file of this patent

UNITED STATES PATENTS

| | | |
|---|---|---|
| 565,068 | Dornfeld | Aug. 4, 1896 |
| 2,711,814 | McCarthy | June 28, 1955 |
| 2,793,615 | Kerkvliet | May 28, 1957 |
| 3,075,657 | Hazen | Jan. 29, 1963 |
| 3,094,205 | Siebring et al. | June 18, 1963 |